Dec. 25, 1945.  V. L. NEMEC  2,391,640
TRAP
Filed Feb. 24, 1944
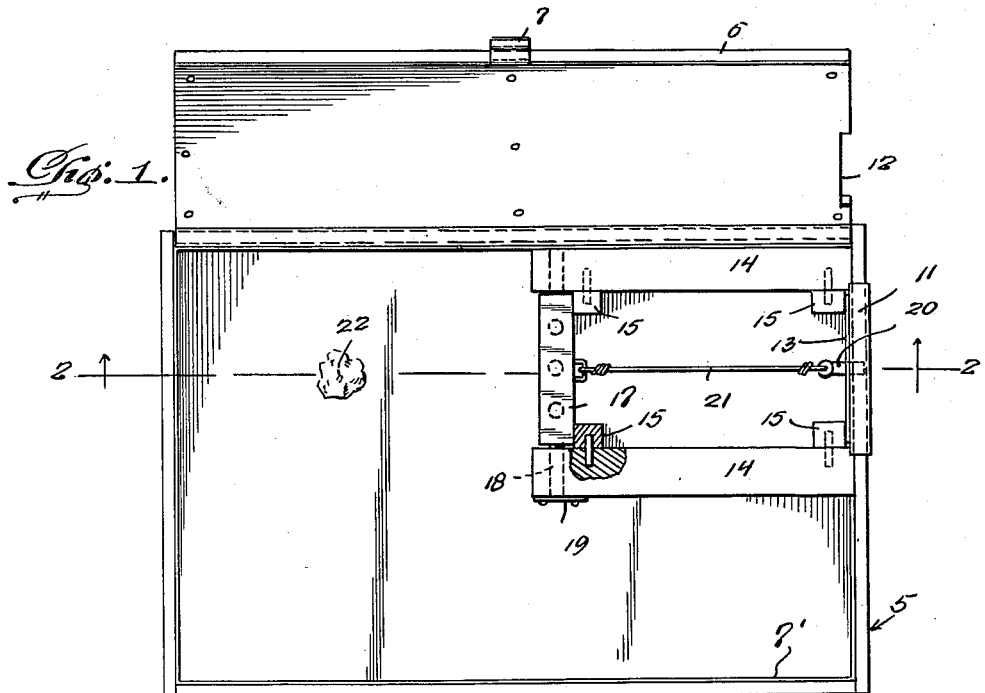
Fig. 1.
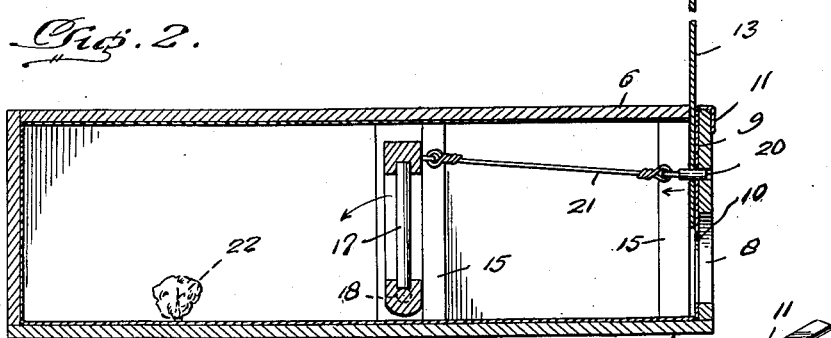
Fig. 2.
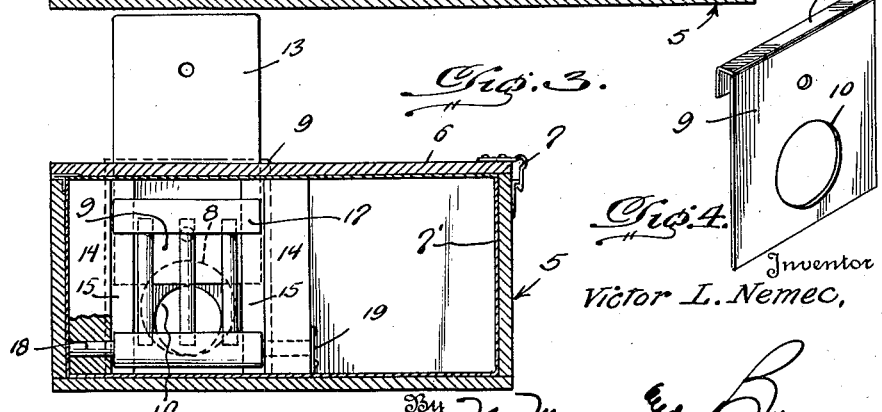
Fig. 3.
Fig. 4.
Inventor
Victor L. Nemec,
By *McMorrow and Berman*
Attorneys Patented Dec. 25, 1945

2,391,640

UNITED STATES PATENT OFFICE 2,391,640

TRAP

Victor L. Nemec, Lewistown, Mont.

Application February 24, 1944, Serial No. 523,710

1 Claim. (Cl. 43—61)

This invention relates to a trap for catching mice, rats and other similar animals, and has for the primary object the provision of a device of this character wherein the animals will be trapped without injury thereto and may be easily removed and destroyed as desired, the construction of the device being such that a rectangular shaped box of inexpensive material may be employed and provided with a non-destructive liner to prevent the animals from gnawing or otherwise destroying the box in order to make an escape and provides ample space for more than one animal at a time therein.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view, partly in section, illustrating a trap constructed in accordance with my invention, and showing the cover thereof in an open position.

Figure 2 is a sectional view taken on line 2—2 of Figure 1.

Figure 3 is a transverse sectional view showing the entrance to the trap and the trap door therefor and the means of operation of the trap door by the animal endeavoring to reach the bait chamber.

Figure 4 is a perspective view illustrating a guard plate for the entrance.

Referring in detail to the drawing, the numeral 5 indicates a substantially rectangular shaped box or receptacle, preferably of an inexpensive material, as for instance, a cigar box may be employed therefor. The box or receptacle 5 has a hinged cover 6 held in a closed position by a catch 7. The walls of the box or container and the cover 6 are provided with a thin liner 7' preferably of metal to prevent animals trapped within the box or receptacle from gnawing or otherwise destroying the latter in order to make an escape.

One of the end walls of the box or receptacle is provided with an entrance opening 8, the size of which will depend on the size of animal desired to be caught by the device. A guard plate 9, made of metal, and provided with an opening 10 to match the opening 8 is arranged against the latter-named end wall and has a hook-shaped upper end 11 to engage thereover, the cover 6 being provided with a notch 12 to permit said cover when in a closed position to clear the hook-shaped end of the guard plate. The guard plate provides a smooth surface for a metallic trap door 13 to work against and the latter is free to slide in a perpendicular position for opening and closing the entrance opening 8.

Solid rigid walls 14 are secured in the box or receptacle and cooperate with each other in forming a runway leading from the entrance opening 8. Pairs of blocks 15 are pinned to the rigid walls 14 and are secured to the bottom wall of the box or receptacle to hold the rigid walls 14 in place. The pairs of blocks are of elongated formation and one pair cooperates with one end wall of the box or receptacle and the guard plate in forming a guideway for slidably supporting the trap door 13.

A gate 17 is located at the inner end of the entrance and is mounted for hinging movement by being provided with a pintle 18 journaled in openings provided in the rigid walls 14. The pintle is removable from the gate and may be removed from the openings of the end walls by being withdrawn in an endwise direction. A removable plate 19 is carried by one of the rigid walls 14 to overlie the pintle to prevent its removal. One pair of the blocks 15 act as stops to prevent the swinging movement of the gate from a vertical position in the direction of the entrance opening 8.

The guard plate and one of the end walls of the box or container are provided with alined openings and the trap door 13 is provided with an opening which when aligned with the openings of the end wall and the guard plate will receive a pin 20 for retaining the trap door in its uppermost position, leaving the entrance opening 8 substantially fully open to allow an animal to enter the runway.

A flexible element 21 connects the pin 20 to the gate 17 and the latter is constructed of a plurality of spaced members so that an animal within the runway can see into the remaining portion of the box or container. A bait supporting pin 22 is secured in the box or container near the gate and in clear view of the animal within the entrance so as to attract the animal and cause the animal to place pressure or force against the gate which results in the pin 20 being pulled from the trap door allowing the same to gravitate into a position of closing the entrance opening 8. The gate 17 under the weight or force of the animal will swing downwardly in the direction indicated by the arrow in Figure 2 so that the animal can enter the bait chamber of the box or container.

After the animal has been caught in the bait chamber of the box or container the lid may be opened and the animal removed or, if desired, the animal may be left in the box or container for the purpose of enticing other animals therein and the person simply repositions the gate 17 into a vertical position and elevates the trap door and places the pin in the openings of the trap door and the guard plate thereby resetting the trap.

A trap of the character described in the foregoing and shown in the drawings will be extremely simple to construct, economical to manufacture and will be durable, consequently the life thereof will last over a long period of time. The metallic lining provided will prevent trapped animals from gnawing their way out when captured, also strengthens or reinforces the box construction. Further, it will be noted that when an animal has been trapped within the device it cannot drag the trap into a hole or some dark corner as often happens with other types of trap and that the trap will in no way be dangerous to children should they tamper therewith.

While I have shown and described the preferred embodiment of my invention, it will be understood that minor changes in construction, combination and arrangement of parts may be made without departing from the spirit and scope of the invention as claimed.

Having thus described my invention, what I claim is:

In a trap, a box including an entrance in one wall thereof and a hinged cover, a non-destructible lining for the box and its cover, a runway formed in the box leading away from the entrance, means in the interior of the box for supporting bait adjacent to the inner end of the runway, a gate hingedly mounted for controlling the inner end of the runway to the interior of the box, a guard plate at the other end of the runway and having an opening matching the entrance and a hook shaped portion to engage over the upper edge of said wall of the box, said cover having a notch to receive the hook shaped end of the guard plate, a slidably mounted trap door having sliding contact with the guard plate and provided with an opening, said guard plate having an opening, a pin to enter the opening of the door and the second named opening of the guard plate for holding the door in an elevated position, a flexible element connecting the pin to the gate to withdraw the pin from the door on the movement of the gate under the influence of an animal endeavoring to reach the bait within the box.

VICTOR L. NEMEC.